United States Patent [19]

Andrianov et al.

[11] 4,020,226
[45] Apr. 26, 1977

[54] FIBROUS FRICTION MATERIAL

[76] Inventors: Kuzma Andrianovich Andrianov, Vystavochny pereulok, 3, kv. 9; Georgy Nikolaevich Bagrov, Universitetsky prospekt, 23, korpus 4, kv. 16; Tatyana Vsevolodovna Vasilieva, ulitsa Volgina, 9, korpus 2, kv. 96; Vladimir Alexandrovich Vasjukov, ulitsa Krasnodarskaya, 46, kv. 14; Sergei Ivanovich Lebedev, Schelkovsky proezd, 3, korpus 2, kv. 34; Vladimir Alexandrovich Makarov, ulitsa Sedova, 8, korpus 1, kv. 68; Lotari Mikhailovich Khananashvili, ulitsa Sumskaya, 6, korpus 2, kv. 244, all of Moscow, U.S.S.R.

[22] Filed: Apr. 23, 1975

[21] Appl. No.: 570,573

[52] U.S. Cl. .................... 428/290; 428/260; 428/408; 428/447; 428/902; 192/107 M; 264/257

[51] Int. Cl.² .......................... F16D 69/02

[58] Field of Search ......... 428/408, 447, 290, 367, 428/260, 902; 192/107 M; 260/448.8 R

[56] References Cited

UNITED STATES PATENTS

| 2,845,378 | 7/1958 | Derich | 428/443 |
|---|---|---|---|
| 3,927,241 | 12/1975 | Augustin | 428/408 |
| 3,956,548 | 5/1976 | Kovac et al. | 428/408 |

*Primary Examiner*—Ralph S. Kendall
*Attorney, Agent, or Firm*—Robert E. Burns; Emmanuel J. Lobato; Bruce L. Adams

[57] ABSTRACT

The invention relates to fibrous friction material and to a process for the production of same. In accordance with the invention, said material comprises carbon fabric, a polymeric thermosetting binder, viz. polyoxyphenylmethanephenoxysiloxane of the formula

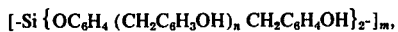

where
$n = 0-2$;
$m = 10-100$, as well as hexamethylenetetramine and barium sulfate, said components being taken in the following percentages by weight:
  binder — 20 to 40
  hexamethylenetetramine — 1 to 2.5
  barium sulfate — 15 to 30
  carbon fabric — the balance.

The proposed process for the production of the fibrous friction material of this invention comprises impregnating carbon fabric with a solution of said polymeric binder in an organic solvent, said solution also comprising hexamethylenetetramine and barium sulfate. The impregnating solution contains said components in the following percentages by weight:
  binder — 29.7 to 30.7
  hexamethylenetetramine — 2.08 to 2.15
  barium sulfate — 15.4 to 17.8
  organic solvent — the balance.

The impregnated carbon fabric is dried at a temperature of from 20° to 70° C. The press material thus obtained is molded by successively exposing it to a temperature of 70° to 80° C. and a specific pressure of 150 to 200 kg/sq.cm. for 2 to 3 hours; to a temperature of 110° to 115° C. and a specific pressure of 150 to 200 kg/sq.cm. for 0.3 to 0.5 hour; to the temperature of the preceding step and a specific pressure of 300 to 400 kg/sq.cm. for 1 to 2 hours; to a temperature of 130° to 140° C. and a specific pressure of 300 to 400 kg/sq.cm. for 1 to 2 hours; and to a temperature of 170° to 180° C. and a specific pressure of 300 to 400 kg/sq.cm. for 1 to 2 hours. The friction material thus produced exhibits improved friction properties, as well as improved heat- and wear resistance.

1 Claim, No Drawings

FIBROUS FRICTION MATERIAL

The present invention relates to fibrous friction materials and more particularly to fibrous friction materials on the basis of carbon fabric as well as to processes for the production of same.

Carbon fabric-based fibrous friction materials are employed in friction assemblies of textile machines as well as in friction clutches of various machines.

It is known in the art to employ a fibrous friction material on the basis of carbon fabric and a polymeric thermosetting binder, viz. a modified phenol-formaldehyde resin (see, for example, French Pat. No. 83,741, Cl. F06d).

There also exists a process for the production of said fibrous friction material which comprises impregnating carbon fabric with a solution of a modified phenol-formaldehyde resin in an organic solvent, drying the thus impregnated carbon fabric at a temperature of from 20° to 70° C., and molding the thus obtained press material at elevated temperature under pressure (see the same patent).

The prior art friction material exhibits a low Martens yield temperature (up to 150° to 200° C), which renders it unsuitable for heavy-duty applications. Besides, the prior art friction material has a coefficient of friction approximately equal to 0.1 to 0.12, too low for its successful application in friction assemblies.

It is an object of the present invention to provide a fibrous friction material with improved friction properties, as well as improved heat- and wear resistance.

It is another object of the present invention to provide a process for the production of a fibrous friction material featuring the above-described properties.

These and other objects are attained by the provision of a fibrous friction material on the basis of carbon fabric and a polymeric thermosetting binder. In accordance with the invention, the proposed fibrous friction material comprises polyoxyphenylmethanephenoxysiloxanes of the formula

$$[-Si\{OC_6H_4(CH_2C_6H_3OH)_nCH_2C_6H_4OH\}_2 -]_m,$$  I.

where
$n = 0-2$;
$m = 10-100$,
as the polymeric thermosetting binder as well as hexamethylenetetramine and barium sulfate, said components being taken in the following percentages by weight:

| | |
|---|---|
| polyoxyphenylmethanephenoxysiloxanes | 20-40 |
| hexamethylenetetramine | 1-2.5 |
| barium sulfate | 15-30 |
| carbon fabric | the balance. |

The proposed fibrous friction material exhibits high mechanical strength, improved friction properties (coefficient of friction, 0.18-0.20), a high Martens yield temperature (up to 350° C) and improved wear resistance. The proposed fibrous friction material can be advantageously employed in friction assemblies of textile machines and automata, in friction clutches of various machines operating in a wide spectrum of conditions, including medium- and heavy-duty conditions, as well as in assemblies experiencing impulse loading.

The choice of polyoxyphenylmethanephenoxysiloxanes of the above formula as the binder of the proposed friction fibrous material can be ascribed to the fact that the main chain of the polymer is composed of alternating atoms of silicon and oxygen and the silicon framing is composed primarily of aromatic groups, and there are from 4 to 8 phenyl groups per silicon atom. Such a structure of the polymer ensures a high carbon residue (about 70 percent) which is formed upon heating of the polymer, and also imparts high heat resistance to the fibrous friction material comprising said polymer. The hydroxyl groups contained in the side chains of the polymer speed up the process of curing of the polymer with hexamethylenetetramine under conditions (temperature, pressure and residence time) close to those employed for the baking of ordinary phenol-formaldehyde resins.

Furthermore, the polymeric thermosetting binder employed in the present invention effectively adheres to carbon fabric, adding to the mechanical strength of the friction material produced in accordance with the invention.

Said polyoxyphenylmethanephenoxysiloxanes of the above formula may be employed both in the form of various mixtures and as individual polymers, the particular form of the binder having no appreciable effect on the properties of the friction material.

Barium sulfate included in the proposed fibrous friction material imparts to said material improved friction properties.

As has been earlier mentioned, the subject of the present invention is also concerned with a process for the production of the proposed friction material. In accordance with the invention, the proposed process comprises impregnating carbon fabric with a solution of a polymeric thermosetting binder in an organic solvent, drying the impregnated carbon fabric at a temperature of from 20° to 70° C., and molding the thus obtained press material at elevated temperature under pressure. In accordance with the invention, said process employs polyoxyphenylmethanephenoxysiloxanes of the above formula as the polymeric thermosetting binder, and an impregnating solution which, alongside with polymeric thermosetting binder, comprises hexamethylenetetramine and barium sulfate, the solution components being taken in the following percents by weight:

| | |
|---|---|
| polyoxypheylmethanephenoxysiloxanes | 29.7-30.7 |
| hexamethylenetetramine | 2.08-2.15 |
| barium sulfate | 15.4-17.8 |
| organic solvent | the balance, | and the molding of the press material is effected by successively exposing the press material to a temperature of 70° to 80° C. and a specific pressure of 150 to 200 kg/sq.cm. for 2 to 3 hours; to a temperature of 110° to 115° C. and a specific pressure of 150 to 200 kg/sq.cm. for 0.3 to 0.5 hour; to the temperature of the preceding step and a specific pressure of 300 to 400 kg/sq.cm. for 1 to 2 hours; to a temperature of 130° to 140° C. and a specific pressure of 300 to 400 kg/sq.cm. for 1 to 2 hours; and to a temperature of 170° to 180° C. and a specific pressure of 300 to 400 kg/sq.cm. for 1 to 2 hours.

The polymeric thermosetting binder included in the proposed fibrous friction material is obtained in the following manner.

First formaldehyde is reacted with phenol taken in the molar ratios of from 1:2 to 3:4, respectively, in the presence of hydrochloric acid taken at the rate of 1 percent of the weight of the parent reagents. The process is conducted with the reaction mixture being gradually heated to a temperature of from 50° to 55° C., whereupon the heating is discontinued. The heat liberated in the reaction raises the temperature of the reaction mixture to 70° or 80° C. The mixture is allowed to stand at the latter temperature for 3 hours, yielding low-molecular products of condensation of phenol with formaldehyde. The reaction to produce said products proceeds by the following route:

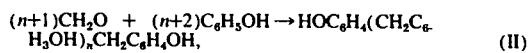

$$(n+1)CH_2O + (n+2)C_6H_5OH \rightarrow HOC_6H_4(CH_2C_6H_3OH)_nCH_2C_6H_4OH, \qquad (II)$$

where
$n = 0–2$.

The low-molecular condensation products thus obtained are charged to a reactor and dissolved in ethanol, whereafter tetraethoxysilane and water are added, water being taken in a quantity necessary for the hydrolysis of the tetraethoxysilane. The reaction mixture is slowly heated to a temperature of 100° to 120° C., with ethanol being simultaneously distilled off. At this set of conditions, the tetraethoxysilane is hydrolyzed to form polydiethoxysiloxanes. The reaction proceeds by the following route:

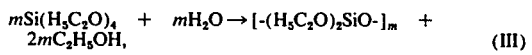

$$mSi(H_5C_2O)_4 + mH_2O \rightarrow [-(H_5C_2O)_2SiO-]_m + 2mC_2H_5OH, \qquad (III)$$

where
$m = 10–100$.

After all ethanol has been distilled off, the pressure in the reactor is set at 400 to 500 mm Hg, and the temperature is slowly increased to 130° C. At this set of conditions, there occurs a reaction of polycondensation of the polydiethoxysiloxanes with the low-molecular products of condensation of phenol with formaldehyde by the following route:

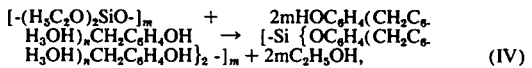

$$[-(H_5C_2O)_2SiO-]_m + 2mHOC_6H_4(CH_2C_6H_3OH)_nCH_2C_6H_4OH \rightarrow [-Si\{OC_6H_4(CH_2C_6H_3OH)_nCH_2C_6H_4OH\}_2-]_m + 2mC_2H_5OH, \qquad (IV)$$

where
$n = 0–2$;
$m = 10–100$.

The process of polycondensation is discontinued as soon as the amount of distilled ethanol reaches 80 to 90 percent of the theoretical, and the gelatinization time equals 4 to 6 minutes. In order to terminate the polycondensation process, ethanol is poured into the reactor. The desired end product (polymeric thermosetting binder) is discharged from the reactor.

The proposed fibrous friction material is produced in the following manner.

First a solution of the polymeric thermosetting binder in an organic solvent also containing hexamethylenetetramine and barium sulfate is prepared (impregnating solution). For the preparation of the impregnating solution use can be made of acetone and a variety of alcohols as the organic solvent. The said components of the impregnating solution are taken in the estimated quantities. The sequence of mixing of said components is not essential and may vary as desired.

The prepared solution is used to impregnate carbon fabric, the carbon fabric preferably containing 70 to 99 percent of carbon and having an ash content of 20 to 0.5 percent at a fabric thickness of 0.5 to 0.7 mm. The impregnated carbon fabric is dried in a desiccator at a temperature of 20° C. for 25 to 30 hours or at a higher temperature (up to 70° C.), with the drying time decreased accordingly. The resultant press material is molded by successively maintaining it at a temperature of 70° to 80° C. and a specific pressure of 150 to 200 kg/sq.cm. for 2 to 3 hours; at a temperature of 110° to 115° C. and a specific pressure of 150 to 200 kg/sq.cm. for 2 to 3 hours; at a temperature of 110° to 115° C. and a specific pressure of 150 to 200 kg/sq.cm. for 0.3 to 0.5 hour; at the temperature of the preceding step and a specific pressure of 300 to 400 kg/sq.cm. for 1 to 2 hours; at a temperature of 130° to 140° C. and a specific pressure of 300 to 400 kg/sq.cm. for 1 to 2 hours; and at a temperature of 170° to 180° C. and a specific pressure of 300 to 400 kg/sq.cm for 1 to 2 hours. Upon completion of the molding procedure, the fibrous friction material obtained in the form of preforms is cooled down to a temperature of 70° to 80° C. at a specific pressure of 300 to 400 kg/sq.cm. and pressed out. The cooling step is included for the convenience of discharging the preforms from the molds.

The above-described procedure is used to produce preforms of various shape, e.g. monolithic cylinders of various diameter and height, which are subsequently machined to desired dimensions.

Practice of the novel process of this invention may be further understood by reference to the following examples describing the production of the proposed fibrous friction material.

EXAMPLE 1

An impregnating solution was prepared of the following composition, g:

| | |
|---|---|
| polyoxyphenylmethanephenoxysiloxanes | 7.700 |
| barium sulfate | 3.850 |
| hexamethylenetetramine | 538 |
| organic solvent: | |
| acetone | 7.700 |
| unpurified ethanol | 5.380 |

The impregnating solution was prepared in the following sequence.

Hexamethylenetetramine was first dissolved in unpurified ethanol, after which the solution thus obtained was added to polyoxyphenylmethanephenoxysiloxanes, and the mixture was thoroughly stirred until all the components were completely dissolved. After this barium sulfate powder was added to the solution, acetone was poured in, and the resultant mixture was thoroughly stirred.

The solution thus prepared was used to impregnate carbon fabric containing 70 to 75 percent of carbon and having an ash content of 20 percent and a thickness of 0.68 mm. The impregnated fabric was dried at a temperature of 20° C for 27 hours. The press material thus obtained was cut into pieces, placed in a mold and molded by successively maintaining the press material at a temperature of 70° C. and a specific pressure of 150 kg/sq.cm. for 2 hours; at a temperature of 110° C.

and a specific pressure of 150 kg/sq.cm. for 0.3 hour; at a temperature of 110° C. and a specific pressure of 300 kg/sq.cm. for 1 hour; at a temperature of 130° C. and a specific pressure of 300 kg/sq.cm. for 1 hour; and at a temperature of 170° C. and a specific pressure of 300 kg/sq.cm. for 1 hour. Upon completion of molding, the fibrous friction material in the form of preforms was cooled down to 80° C. at a specific pressure of 300 kg/sq.cm. and pressed out.

This procedure yielded monolithic cylindrical preforms having a diameter D = 50 mm and a height $h$ = 110 mm. The composition of the fibrous friction material obtained in the form of preforms was as follows, wt.%:

| | |
|---|---|
| polyoxyphenylmethanephenoxysiloxanes | 28 |
| hexamethylenetetramine | 1.5 |
| barium sulfate | 20 |
| carbon fabric | 50.5 |

EXAMPLE 2

An impregnating solution was prepared of the following composition, g:

| | |
|---|---|
| polyoxyphenylmethanephenoxysiloxanes | 14.300 |
| barium sulfate | 8.570 |
| hexamethylenetetramine | 1.000 |
| organic solvent: | |
| acetone | 14.300 |
| unpurified ethanol | 10.000. |

The preparation of the impregnating solution was conducted in the following sequence.

Hexamethylenetetramine was dissolved in unpurified ethanol. The thus prepared solution of hexamethylenetetramine and acetone were added to polyoxyphenylmethanephenoxysiloxanes, and the mixture was thoroughly stirred until all components were completely dissolved. Then barium sulfate powder was added to the solution, and the components were thoroughly stirred.

The procedure of press material preparation and its molding into preforms was carried out as in Example 1. The resultant fibrous friction material had the following composition, wt.%:

| | |
|---|---|
| polyoxyphenylmethanephenoxysiloxanes | 35 |
| hexamethylenetetramine | 2.2 |
| barium sulfate | 30 |
| carbon fabric | 32.8 |

Example 3

An impregnating solution was prepared of the following composition, g:

| | |
|---|---|
| polyoxyphenylmethanephenoxysiloxanes | 10.600 |
| barium sulfate | 5.820 |
| hexamethylenetetramine | 745 |
| organic solvent: | |
| acetone | 10.600 |
| hydrolytic ethanol | 7.450. |

The impregnating solution was prepared in a procedure duplicating that of Example 1.

Said solution was used to impregnate carbon fabric containing 99.2 percent of carbon and having an ash content of 0.5 percent and a thickness of 0.58. The impregnated fabric was dried at a temperature of 70° C. for 6 hours. The press material thus obtained was cut into pieces, placed in a mold, and molded by being successively exposed to a temperature of 80° C. and a specific pressure of 200 kg/sq.cm. for 3 hours; to a temperature of 115° C. and a specific pressure of 200 kg/sq.cm. for 0.5 hour; to a temperature of 115° C. and a specific pressure of 400 kg/sq.cm. for 2 hours; to a temperature of 140° C. and a specific pressure of 400 kg/sq.cm. for 2 hours; and to a temperature of 180° C. and a specific pressure of 400 kg/sq.cm. for 2 hours. Upon completion of molding, the product fibrous friction material obtained in the form of preforms was cooled down to 80° C. at a specific pressure of 400 kg/sq.cm. and pressed out.

The above-described procedure yielded monolithic cylindrical preforms of diameter D = 100 mm and height $h$ = 180 mm. The friction fibrous material obtained in the form of preforms had the following composition, wt.%:

| | |
|---|---|
| polyoxyphenylmethanephenoxysiloxanes | 32 |
| hexamethylenetetramine | 1.8 |
| barium sulfate | 25 |
| carbon fabric | 41.2 |

Example 4

An impregnating solution was prepared on the following composition, g:

| | |
|---|---|
| polyoxyphenylmethanephenoxysiloxanes | 4.470 |
| barium sulfate | 2.320 |
| hexamethylenetetramine | 313 |
| organic solvent: | |
| acetone | 4.470 |
| unpurified ethanol | 3.130. |

The impregnating solution was prepared in a procedure duplicating that of Example 2.

Said solution was used to impregnate carbon fabric containing 99.2 percent of carbon and having an ash content of 0.5 percent and a thickness of 0.58 mm. The impregnated fabric was dried at a temperature of 50° C. for 9 hours. The product press material was cut into pieces, placed in a mold, and molded in a procedure duplicating that of Example 3.

The products of the procedure were monolithic cylindrical preforms having a diameter D = 90 mm and a height $h$ = 180 mm. The friction fibrous material obtained in the form of preforms had the following composition, wt%:

| | |
|---|---|
| polyoxyphenylmethanephenoxysiloxanes | 20 |
| hexamethylenetetramine | 1 |
| barium sulfate | 15 |
| carbon fabric | 64 |

EXAMPLE 5

An impregnating solution was prepared of the following composition, g:

| | |
|---|---|
| polyoxyphenylmethanephenoxysiloxanes | 20.000 |
| barium sulfate | 10.500 |
| hexamethylenetetramine | 1.400 |
| organic solvent: | |
| acetone | 20.000 |
| hydrolytic ethanol | 14.000. |

The impregnating solution was prepared as follows. Hexamethylenetetramine was dissolved in hydrolytic ethanol. Then barium sulfate powder was added to polyoxyphenylmethanephenoxysiloxanes, after which the prepared solution of hexamethylenetetramine and acetone were added to the mixture, and the resultant solution was thoroughly stirred.

The press material was prepared and molded into preforms in a procedure duplicating that of Example 1. The resultant fibrous friction material had the following composition, wt.%:

| | |
|---|---|
| polyoxyphenylmethanephenoxysiloxanes | 40 |
| barium sulfate | 30 |
| hexamethylenetetramine | 2.5 |
| carbon fabric | 27.5 |

The fibrous friction material produced in Examples 1 to 5 exhibited the following physico-mechanical properties:

| | |
|---|---|
| volumetric weight, g/cu.cm. | 1.55–1.75 |
| cross-breaking strength, kg/sq.cm. | 1.500–1.830 |
| compressive strength, kg/sq.cm. | 1.900–2.250 |
| impact strength, kg.cm/sq.cm. | 30.38 |
| coefficient of friction | 0.15–0.2. |
| coefficient of thermal conductivity, large calories/m.hr° C | 0.65–0.8 |
| Martens yield temperature, ° C | 340–350 |

In order to determine the wear resistance of the product fibrous friction material, friction disks were made therefrom with the following dimensions, mm: external diameter $D = 39$; internal diameter $d = 16$; thickness $h = 4$. Said disks were installed in the knotters of automatic winding frames and tested under actual operating conditions. After a month of service at a unit load on the disk of from 4 to 10 kg/sq.cm. the thickness wear on the friction disk made of the fibrous friction material obtained in Examples 1 to 5 amounted to 0.007 to 0.025 mm.

The fibrous friction material obtained in Examples 1 to 5 exhibits a high coefficient of friction, high heat- and wear resistance as well as adequate mechanical strength, so that said material may be successfully employed in assemblies designed to create or transmits stable braking torque or torsional moment and experiencing transient or permanent loading in continuous and intermittent friction of the working surfaces.

What is claimed is:

1. A fibrous friction material, essentially consisting of carbon fabric; impregnated with a polymeric thermosetting binder, essentially consisting of polyoxyphenylmethanephenoxysiloxanes of the formula

where
$n = 0–2$;
$m = 10–100$, hexamethylenetetramine, and barium sulfate; said components being present in the following percentages by weight:

| | |
|---|---|
| polyoxyphenylmethanephenoxysiloxanes | 20–40 |
| hexamethylenetetramine | 1–2.5 |
| barium sulfate | 15–30 |
| carbon fabric | the balance. |

* * * * *